Nov. 21, 1944.   W. FACKS   2,363,053
AUTOMATIC LATHE
Filed Aug. 7, 1942   2 Sheets-Sheet 1
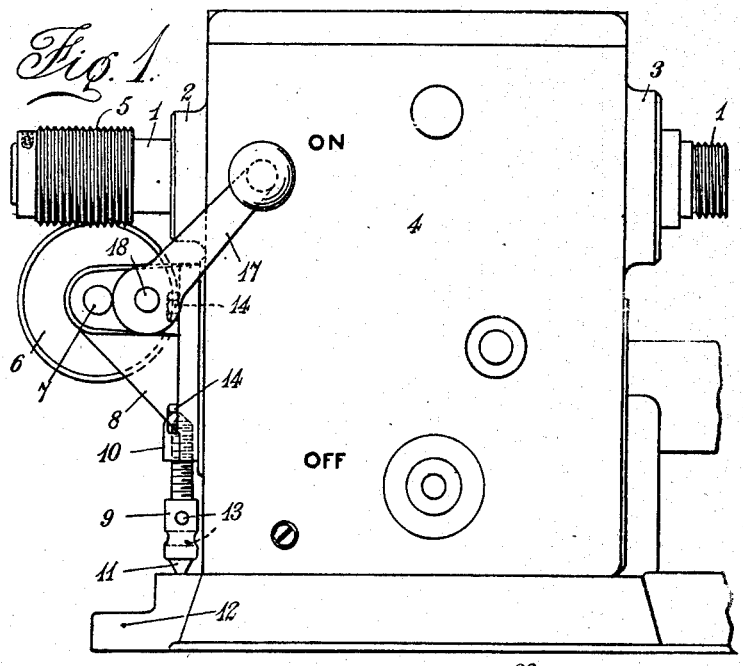
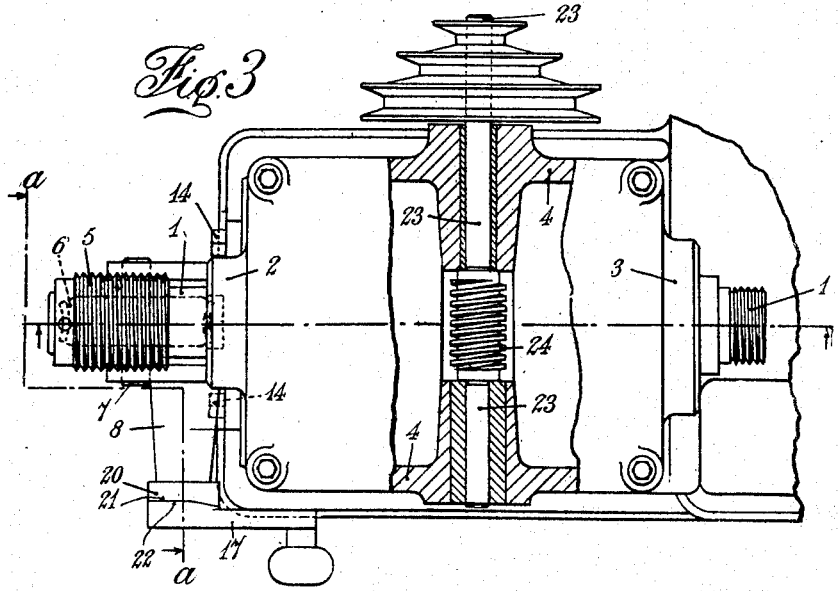
INVENTOR.
WILLIAM FACKS.
BY Lockwood, Goldsmith & Galt
ATTORNEYS.

Nov. 21, 1944.   W. FACKS   2,363,053
AUTOMATIC LATHE
Filed Aug. 7, 1942   2 Sheets-Sheet 2
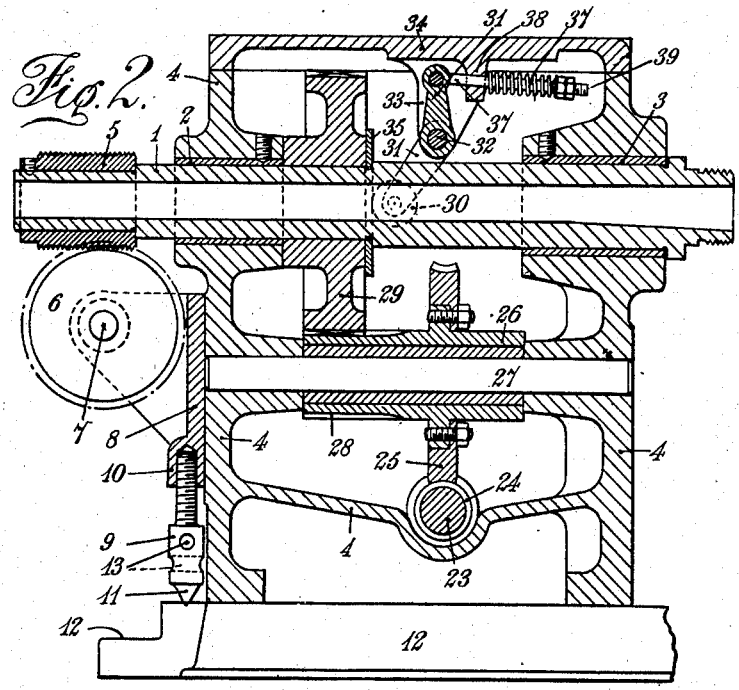
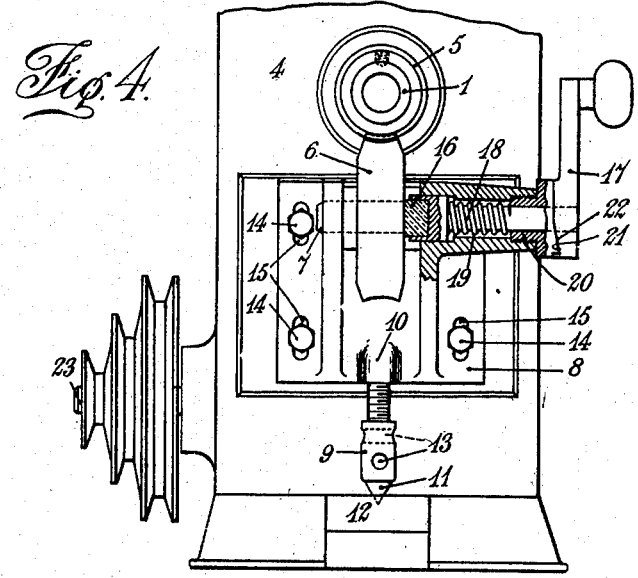
INVENTOR.
WILLIAM FACKS.
BY Lockwood, Goldsmith & Galt
ATTORNEYS.

Patented Nov. 21, 1944

2,363,053

UNITED STATES PATENT OFFICE 2,363,053

AUTOMATIC LATHE

William Facks, Egham Hythe, Egham, England

Application August 7, 1942, Serial No. 454,026
In Great Britain September 12, 1941

10 Claims. (Cl. 10—154)

This invention relates to improvements in automatic lathes and particularly to means for feeding the work to the tool.

The chief object of the present invention is to provide means whereby work pieces may be operated upon continuously without stopping the machine or reversing the drive.

A further object is to provide for instance on a thread milling machine means whereby the mandrel adapted to carry the work is moved longitudinally in one direction for the cutting or milling operation and moved in the opposite direction to enable the work piece to be removed and replaced by a further work piece to be operated upon automatically without stopping the machine thereby saving considerable time in the feeding operation of the machine.

With these and other objects in view the invention consists in providing the driven mandrel of an automatic lathe with a threaded member constantly in mesh with a worm wheel or the like adapted to be locked against rotation in one direction to move the mandrel longitudinally, the return movement of the mandrel being effected when the worm wheel is unlocked.

The invention further consists in providing in an automatic lathe a mandrel and means for continuously rotating the mandrel, a threaded member on said mandrel constantly in mesh with a worm wheel adapted to be held against rotation in one direction to move longitudinally the mandrel against pressure means adapted to return the mandrel when the worm wheel holding means are released, the arrangement being such that the worm wheel will act as a free wheel device and co-operate with the threaded member.

One form of the invention will now be described with reference to the accompanying drawings in which—

Figure 1 is a front view of a headstock of an automatic lathe.

Figure 2 is a vertical section showing the mandrel and driving mechanism therefor;

Figure 3 is a plan showing parts in section, and

Figure 4 is a sectional end elevation taken on the line a—a of Figure 3.

As shown the mandrel 1 of the headstock of a thread milling machine is in the form of a sleeve which is rotatably mounted in suitable bearings 2 and 3 fitted in a casing 4 carrying gearing mechanism to be hereinafter described, which gearing mechanism is driven by any suitable power means. On the outer projecting end of the mandrel 1 is secured a threaded member 5 conveniently in the form of a cylindrical worm. This threaded worm 5 is constantly in mesh with a worm wheel or the like 6 mounted on a shaft 7 carried by a bracket member 8 preferably adjustably secured on the side of the casing 4. Conveniently the adjusting means for the bracket member 8 comprises a vertically arranged prop member 9 adapted to screw into a lug 10 provided at the bottom of the bracket 8 and formed at its lower end with a conical extension 11 to engage against the base 12 of the casing 4. Thus the bracket 8 can be minutely adjusted to permit of the efficient engagement of the teeth of the worm wheel 6 and the threaded member 5 by the rotation of the prop member 9 which may be formed with holes 13 for the insertion of a tommy bar. The bracket member 8 is adapted to be bolted in its adjusted position in the casing 4 by bolts 14 passing through vertically arranged slots 15 formed in the said bracket member 8. The bracket member 8 is also adapted to carry suitable braking mechanism adapted to hold the worm wheel 6 against rotation in one direction. Conveniently the braking mechanism comprises a pad member 16 adapted to be moved into contact with one side face of the worm wheel 6 through the medium of a hand operated lever 17 fitted on a spindle 18 mounted for slidable movement and partial rotation in the said bracket member 8. The pad member 16 which is fitted on the inner end of the spindle 18 is preferably resiliently mounted by providing a coiled spring 19 having an abutment at one end against the pad member 16 and an abutment at the other end against a sleeve 20 screwed into the bracket 8. The outer face of this sleeve 20 is formed with a cam surface 21 adapted to co-operate with a cam surface 22 formed on the contacting face of the lever 17. Thus the pad member 16 can be moved into and out of its braking position by the partial rotation of the lever 17. The arrangement is such that the worm wheel 6 can be braked when the lever 17 is in one position indicated by the word "on" in Figure 1 and freed to revolve when the lever is moved to the "off" position. It will be seen that the spring 19 will maintain the cam surfaces 21 and 22 in co-operation. Obviously, any other suitable means, such as for instance expanding or contracting brake bands may be employed to permit of the rotation of the worm wheel 6 against rotation. The gearing mechanism for driving the mandrel 1 conveniently comprises a driven shaft 23 mounted transversely in the casing 4 and carrying a worm 24 co-operating with a worm wheel 25 secured on a sleeve 26 rotatably mounted on a shaft 27 disposed parallel with and below the mandrel 1. One end of this sleeve 26 is formed with elongated gear teeth 28 to co-operate with a gear wheel 29 mounted on the mandrel 1 which is adapted to be slid forwardly through the medium of its threaded member 5 co-operating with the braked worm wheel 6 against the action of suitable returning means which may be in the nature of a spring, dashpot or counter-weighted lever means. Conveniently, the returning means comprise a roller or rollers 30 carried by a bifurcated lever member 31 having a fulcrum 32 in a depending lug member 33 formed on the inner face of a cover 34 of the casing 4. The rollers 30 are normally held against a disc or the like 35 mounted on the side of the mandrel gear wheel 29 by a compression spring 36 preferably adjustably mounted on a rod 37 connected with the upper end of the lever or member 31, the spring 36 having an abutment at one end against a flange 38 adjacent the lug 33 and an abutment at the other end against adjusting and locking nuts 39 screwed on the outer end of the rod 37. The arrangement is such that when the cam lever 17 is operated to take off the brake the worm wheel 6 will be partially rotated through the medium of the continuously revolving mandrel 1 and its engaging worm 5 and hence slide the mandrel 1 rearwardly which rearward movement is assisted by the returning means. Within the hollow mandrel 1 may be mounted a shaft not shown having at its outer projecting end a hand wheel and at its inner projecting end expanding clutch means, not shown, to hold the work. It will thus be seen that when a work piece is fitted on the clutch means, operated by the last mentioned hand wheel, the mandrel, carrying the work piece, will be moved forwardly to enable the cutting operation to be performed when the lever 17 is operated to brake the worm wheel 6. This forward movement of the mandrel occurs because worm wheel 6 is now stationary, while threaded member 5 is rotating, hence, the member 5 must move forward in opposition to the returning means. The cutting mechanism not shown may comprise a longitudinally slidable base member carrying a transversely movable cutter carrier, the cutting member being a thread milling cutter mounted on a longitudinally arranged shaft driven in any suitable or well known manner.

In operation it will be seen that the mandrel 1 will be moved to zero position automatically to enable the work to be clutched and when the brake is applied to the worm wheel 6 the mandrel 1 will be moved forwardly to enable the cutting operation to be performed by, for instance, the transversely movable cutter. When the cutting operation is completed the lever 17 is operated to take off the brake so that the parts are again returned to the zero position to enable the work to be removed and a fresh work piece to be fitted on the clutch. Thus a thread can be milled in the minimum time. Obviously the arrangement may be such that the mandrel can be moved either forwardly or backwardly according to the direction of rotation of the mandrel or the direction of the pitch of the cooperating threads of the worm and worm wheels.

Although the invention is described more particularly in relation to the headstock of a thread milling lathe, the invention may be applied to the traversing means of the saddle of a lathe.

What I claim is:

1. A driven mandrel adapted for incorporation in an automatic lathe and provided with a worm wheel constantly in threaded member, a worm wheel constantly in mesh therewith, means for locking the worm wheel against rotation for longitudinal movement of the mandrel in one direction, return movement of the mandrel being permitted by the release of said means and the rotation of said worm wheel, a gearing mechanism operatively connected to the mandrel for mandrel rotation, the gear mechanism comprising a driven shaft mounted transversely in the casing, a worm on said shaft, a worm wheel cooperating with the transverse shaft worm, another shaft disposed parallel with the mandrel, and a sleeve rotatable on said parallel shaft and including a worm wheel cooperating with the transverse shaft worm and gear teeth cooperating with a gear wheel mounted on the mandrel.

2. A work supporting mandrel adapted for incorporation in an automatic lathe, means for continuously rotating the mandrel, a threaded member on said mandrel, a worm wheel constantly in mesh with the threaded member, means for holding said worm wheel against rotation for longitudinal movement of the mandrel in one direction, pressure means effective to return the mandrel when the worm wheel holding means is released, the worm wheel then acting as a free wheel device, gearing mechanism operatively connected to the mandrel for mandrel rotation, the gear mechanism comprising a driven shaft mounted transversely in the casing, a worm on said shaft, a worm wheel cooperating with the transverse shaft worm, another shaft disposed parallel with the mandrel, and a sleeve rotatable on said parallel shaft and including a worm wheel cooperating with the transverse shaft worm and gear teeth cooperating with a gear wheel mounted on the mandrel.

3. A work supporting mandrel for incorporation in an automatic lathe, means for continuously rotating the mandrel, a threaded member on said mandrel, a worm wheel constantly in mesh with the threaded member, means for holding said worm wheel against rotation for longitudinal movement of the mandrel in one direction, and pressure means effect to return mandrel when the worm wheel holding means is released, the worm wheel then acting as a free wheel device, said pressure means comprising a lever, spring means acting thereon, a roller means, and a disc carried by the mandrel, said spring means normally constraining the roller means into disc engagement.

4. A work supporting mandrel for incorporation in an automatic lathe, means for continuously rotating the mandrel, a threaded member on said mandrel, a worm wheel constantly in mesh with the threaded member, means for holding said worm wheel against rotation for longitudinal movement of the mandrel in one direction, and pressure means effect to return the mandrel when the worm wheel holding means is released, the worm wheel then acting as a free wheel device, said pressure means comprising a lever, spring means acting thereon, a roller means, and a disc carried by the mandrel, said spring means normally constraining the roller means into disc engagement, and means for adjusting the force of said spring means.

5. A driven member adapted for incorporation in a lathe and provided with a threaded member, a worm wheel constantly in mesh therewith, and means for locking the worm wheel against rotation for longitudinal movement of the first mentioned member in one direction, return movement thereof being permitted when the worm wheel is unlocked by said means, the locking means including a friction pressure member applied to said worm wheel, a slidably mounted spindle supporting the friction pressure member, and resilient means urging the friction pressure member into side face engagement with the worm wheel, and lever operable cam means operatively associated with the slidably mounted spindle for manual sliding movement control thereof.

6. A work supporting mandrel adapted for incorporation in an automatic lathe, means for continuously rotating the mandrel, a threaded member on said mandrel, a worm wheel constantly in mesh with the threaded member, means for holding said worm wheel against rotation for longitudinal movement of the mandrel in one direction, and pressure means effective to return the mandrel when the worm wheel holding means is released, the worm wheel then acting as a free wheel device, the holding means including a friction pressure member applied to said worm wheel, a slidably mounted spindle supporting the friction pressure member, and resilient means urging the friction pressure member in this side face engagement with the worm wheel, and lever operable cam means operatively associated with the slidably mounted spindle for manual sliding movement control thereof.

7. A driven mandrel adapted for incorporation in an automatic lathe and provided with a threaded member, a worm wheel constantly in mesh therewith, means for locking the worm wheel against rotation for longitudinal movement of the mandrel in one direction, return movement of the mandrel being permitted by the release of said means and the rotation of said worm wheel, a casing rotatably supporting said mandrel, and means projecting from the casing rotatably supporting the worm wheel, said projecting means comprising a bracket member, and means adjustably securing said bracket member to said casing.

8. A work supporting mandrel adapted for incorporation in an automatic lathe, means for continuously rotating the mandrel, a threaded member on said mandrel, a worm wheel constantly in mesh with the threaded member, means for holding said worm wheel against rotation for longitudinal movement of the mandrel in one direction, pressure means effective to return the mandrel when the worm wheel holding means is released, the worm wheel then acting as a free wheel device, a casing rotatably supporting said mandrel, gearing supported by the casing for rotating the mandrel, and means projecting from the casing rotatably supporting the worm wheel, said projecting means comprising a bracket member and means adjustably securing said bracket member to said casing.

9. A driven mandrel adapted for incorporation in an automatic lathe and provided with a threaded member, a worm wheel constantly in mesh therewith, means for locking the worm wheel against rotation for longitudinal movement of the mandrel in one direction, return movement of the mandrel being permitted by the release of said means and the rotation of said worm wheel, a casing rotatably supporting said mandrel, and means projecting from the casing rotatably supporting the worm wheel, said projecting means comprising a bracket member and means adjustably securing said bracket member to said casing, said adjusting means including an adjustable prop interposed between the casing and the projecting means and bolt and slot connections for rigidly anchoring the bracket to the casing in prop adjusted position.

10. A work supporting mandrel adapted for incorporation in an automatic lathe, means for continuously rotating the mandrel, a threaded member on said mandrel, a worm wheel constantly in mesh with the threaded member, means for holding said worm wheel against rotation for longitudinal movement of the mandrel in one direction, pressure means effective to return the mandrel when the worm wheel holding means is released, the worm wheel then acting as a free wheel device, a casing rotatably supporting said mandrel, gearing supported by the casing for rotating the mandrel, and means projecting from the casing rotatably supporting the worm wheel, said projecting means comprising a bracket member and means adjustably securing said bracket member to said casing, said adjusting means including an adjustable prop interposed between the casing and the projecting means and bolt and slot connections for rigidly anchoring the bracket to the casing in prop adjusted position.

WILLIAM FACKS.